United States Patent [19]

Egli

[11] Patent Number: 4,822,181
[45] Date of Patent: Apr. 18, 1989

[54] HYDROSTATIC SUPPORT DEVICE AND METHOD

[75] Inventor: Werner H. Egli, Minneapolis, Minn.

[73] Assignee: Honeywell Inc., Minneapolis, Minn.

[21] Appl. No.: 595,804

[22] Filed: Apr. 2, 1984

[51] Int. Cl.⁴ .............................................. F16C 32/06
[52] U.S. Cl. ....................................... 384/12; 384/124
[58] Field of Search ............... 308/5 R, 3 A, DIG. 1; 384/111, 112, 113, 107, 118, 121, 123, 100, 114, 115, 286, 291, 292, 293, 322, 369, 12, 99, 109; 184/5, 100, 24, 6.14, 6.26, 6.28

[56] References Cited

U.S. PATENT DOCUMENTS

| | | | |
|---|---|---|---|
| 3,048,043 | 8/1962 | Slater et al. | 384/109 X |
| 3,109,514 | 11/1963 | Deflandre | 184/6.14 X |
| 3,195,963 | 7/1965 | Anderson | 384/109 |
| 3,439,962 | 4/1969 | Gothberg | 384/109 X |
| 3,655,248 | 4/1972 | Hirs | 384/100 |
| 3,981,546 | 9/1976 | Sperman | 308/5 R |
| 4,183,288 | 1/1980 | Miyao | 384/107 X |
| 4,457,566 | 7/1984 | Moshin | 384/121 X |

FOREIGN PATENT DOCUMENTS 0013044 2/1978 Japan .................................. 305/5 R Primary Examiner—John M. Jillions
Attorney, Agent, or Firm—William T. Udseth; John G. Shudy, Jr.

[57] ABSTRACT

Fluid comsumption is dramatically reduced in hydrostatic support devices by texturing the supporting surface and/or the surface of the object being supported so that a series or constrictions or lossy orifices are provided along the flow path of the supporting fluid. Further, the stability of the supported object is enhanced by the present invention.

7 Claims, 2 Drawing Sheets

HYDROSTATIC SUPPORT DEVICE AND METHOD

BACKGROUND OF THE INVENTION

1. Field of the Invention

This invention relates to hydrostatic support devices having a supporting surface wherein either the supporting surface or the surface of the object being supported, or both, are textured in order to provide a plurality of restrictions along the flow path of the supporting fluid.

2. Prior Art

Gas supported bearings have been employed in many devices. In U.S. Pat. No. 3,048,043 to J. N. Slater et al, gas supported bearings (see FIGS. 4 and 6 therein) in a gyroscope employ a series of inclined wedges separated by a series of plane portions or surfaces. Slater indicates that the wedges may be either on the thrusting surface or on the surface receiving the thrust.

In U.S. Pat. No. 3,195,963 to T. Anderson, a gas-lubricated, stepped bearing for near frictionless static and dynamic support of various objects is disclosed. The gas-lubricated bearing comprises a generally solid bearing seat having a recessed portion, the recessed portion defining a step at a common altitude on the periphery thereof. Anderson allows for a series of such steps. However when a series of steps are employed, the gap between the object supported and each successive step is smaller than the gap between the object supported and the preceding step. The steps serve to reduce vertical vibrations of the supported object upon the bearing seat. The steps cause the laminar flow of the gas to diverted from its previous path around the bearing. Anderson indicates that his invention can be used to support any circular cross section object. The steps are expressly distinguished from "grooves" or "zones" used, for example, to drain fluid or distribute pressure.

Further, in U.S. Pat. No. 3,439,962 to K. E. A. Gothberg, a reversible sliding gas bearing is disclosed comprising a stationary member and a rotatable member, both having confronting bearing surfaces, and intermediate member disposed between the sliding surface. The intermediate member also has sliding surfaces which confront and conform in shape to the sliding surfaces of the rotatable and stationary members. Spiral or helical grooves are provided on at least a portion of the surface of the intermediate member to pump supporting fluid into a support chamber when the rotatable member rotates either clockwise or counterclockwise.

For many hydrostatic bearing support systems the load is substantial thus necessitating high pressure fluid supplies. If simple clearance geometry is employed (i.e., the cross sectional dimensions of the flow path of the supporting fluid are constant or smoothly varying along the flow path), the result is a high outrush of supporting fluid through the bearing clearance. This consumes a great deal of supporting fluid, causes high viscous shear on the bearing and, possibly, impulse forces due to the exiting fluid impinging on the bearing. These effects are particularly distasteful for some applications such as the support of bearings in gyroscopes with gases. The high outflow entails high pumping power, or large storage bottles, with attendant payload and/or size penalties. The viscous shear and windage forces in such gyroscopes result in high torques and hence high attitude drift rates.

The devices disclosed by Slater and Gothberg do not describe means and methods for substantially reducing supporting fluid consumption rates in hydrostatic support devices. It would also be advantageous to reduce fluid consumption with a device which could be easily constructed and would be adaptable to virtually any supporting surface and/or the surface of the object being supported.

Further, although the device disclosed by Anderson does divert the kinetic energy of the laminar flow of the supporting fluid at each step, the successive decreases in the cross section of the flow path of the supporting fluid is not an efficient means or method to reduce the consumption rate of the support fluid. Further, Anderson discloses a device which is limited to supporting objects having circular cross sections and his disclosed structure can be used with bearing surfaces of only very particular shapes.

SUMMARY OF THE PRESENT INVENTION

The present invention is a device for hydrostatically supporting an object above a support surface with a flowing fluid wherein at least a part of either the support surface or object surface, or both, is configured so that the fluid encounters a plurality of alternating reduced and abruptly expanded openings along the flowpath. The present invention substantially reduces the rate of fluid consumption as compared to simple clearance geometry. That is, for the same minimum clearance between the supported object and the supporting surface in the smooth geometry case and in present invention, similar support can be provided yet the present invention requires far less supporting fluid. Conversely, for a given rate of fluid consumption in the smooth geometry case and in the present invention, the present invention will provide similar support with a larger minimum clearance between the supported object and the supporting surface than the smooth geometry configuration.

The method of the present invention is to hydrostatically support an object above a support surface with a flowing fluid by providing a plurality of alternating reduced and abruptly expanded openings.

DESCRIPTION OF THE PREFERRED EMBODIMENT

Figure 1:
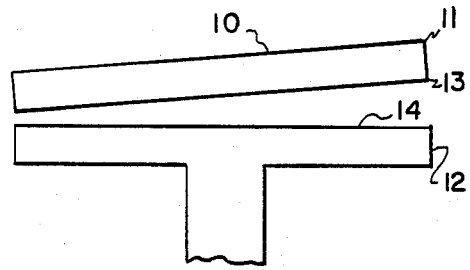
FIG. 1 is a plan view of th first embodiment of the present invention including a supported object.
Figure 2:
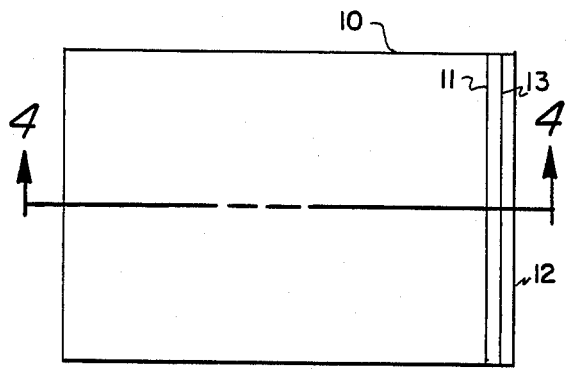
FIG. 2 is a top view of FIG. 1.

In FIG. 1 an object or bearing 10 is supported by support member 12. Object 10 includes edges 11 and 13. Support member 12 has a supporting surface 14 and is coupled to a means 16 for directing a supporting fluid to the surface of object 10. Fluid directing means 16 is conveniently a tube connected at the center of the bottom of support member 12.

Figure 3:
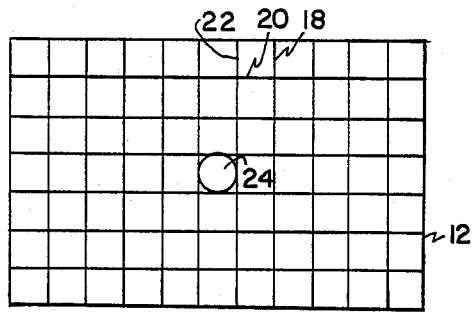
FIG. 3 is a top view of FIG. 1 with the supported object removed.

Supporting surface 14 is displayed in FIG. 3 (similar structure is like numbered in all the Figures for clarity). Therein a plurality of ridges cover surface 14. Each ridge is one side of the squares formed by the grid or honeycomb structure on surface 14, e.g., sides 18, 20 and 22. Opening 24 of tube 16 is also shown.

Figure 4:
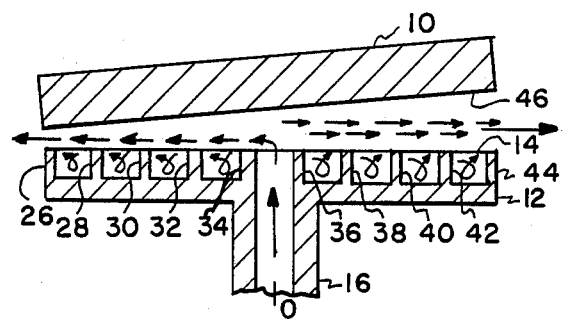
FIG. 4 is a sectional view of FIG. 2 along line 4—4.

FIG. 4 is a cross sectional view of FIG. 1 displaying the cross sections of ten ridges (i.e., ridges 26, 28, 30, 32, 34, 36, 38, 40, 42 and 44).

In operation a supporting fluid (e.g., air) is pumped up tube 16 and follows the path shown by the arrows in FIG. 4. As the air is directed along surface 14, it encounters a series of lossy orifices defined by the bottom 46 of object 10 and each of the ridges (e.g., ridges 26 through 44). This series of lossy orifices significantly reduces the flow rate because after each orifice constriction, the through-flowing air loses much of its dynamic head. Although a small pressure drop occurs after each orifice, for normal operation the supporting pressure is not significantly affected. Provision of this series of lossy orifices can alternately be described as providing a flow path for the supporting fluid with a cross section which alternately is reduced and then abruptly expanded. Note that for the embodiments shown in Figure 3 and 4, the air will in fact spread out in all directions across surface 14 from opening 24.

The following analysis further describes the present invention. Assuming a small pressure loss through each orifice, after each orifice or restriction along the flow path pressure p drops by almost:

$$\Delta p = \rho V^2 / 2 \tag{1}$$

where $\rho$ is the density of the support fluid and V is the flow speed through the orifice.

Note that:

$$\rho V = \dot{m}/A \tag{2}$$

and for compressible fluids $$\rho = kp/u^2 \tag{3}$$

where
$\dot{m}$ = the flow rate of the mass of the supporting fluid
A = the cross sectional area of the flow path at each orifice (i.e., clearance times width)
u = speed of sound in the supporting fluid and
k = the ratio of specific heats at constant pressure and constant volume.

Using equations 2 and 3 to eliminate V from equation 1 yields:

$$\Delta p = \frac{1}{2\rho}\left(\frac{\dot{m}}{A}\right)^2 = \frac{u^2}{2pk}\left(\frac{\dot{m}}{A}\right)^2. \tag{4}$$

Hence:

$$2p \cdot \Delta p \approx \Delta(p^2) = \frac{u^2}{K}\left(\frac{\dot{m}}{A}\right)^2. \tag{5}$$

Thus if air passes through N constrictions in flowing from opening 24 to the outer edge of support member 12:

$$P_1^2 - P_{AT}^2 = N\Delta(p^2) = \frac{Nu^2}{k}\left(\frac{\dot{m}}{A}\right)^2. \tag{6}$$

where $P_1$ is the initial pressure at opening 24 and $P_{AT}$ is the atmospheric pressure at the exit.

Solving equation 6 for gas consumption results in:

$$\dot{m} = \frac{A}{u}(k(P_1^2 - P_{AT}^2))^{\frac{1}{2}}. \tag{7}$$

One can compare the gas consumption for the supporting fluid flowing through N restrictions along the flow path with the gas consumption for a flow path with a constant clearance. First assume for illustration that k equals 1.4 and that for constant clearance the gas flow is choked flow (i.e., there is sufficient difference between $P_1$ and $P_{AT}$ that the supporting fluid is moving at its limiting velocity). Gas consumption for the constant clearance case with a compressible gas will then be:

$$\dot{m} = 0.5656 \, AP_1/u \tag{8}$$

Since equation 7 gives the gas consumption for unchoked flow of a compressible gas, the unchoked and choked flows can be compared by:

$$\frac{\dot{m}_{textured}}{\dot{m}_{smooth}} = 1.573\left(\frac{1 - P_{AT}^2/P_1^2}{N}\right)^{\frac{1}{2}} \approx \frac{1.573}{(N)^{\frac{1}{2}}}. \tag{9}$$

If for example the supporting gas flows through 30 orifices, equation 9 shows that the flow rate is reduced to 29% of that for plane smooth clearance.

If the above analysis were conducted for an incompressible fluid such as a liquid, $\rho$ would be a constant and equation 7 would reduce to:

$$\dot{m} = A\left(\frac{2\rho(P_1 - P_{AT})}{N}\right)^{\frac{1}{2}}. \tag{10}$$

Further, equation 9 would simply be:

$$\frac{\dot{m}_{textured}}{\dot{m}_{smooth}} = \frac{1}{(N)^{\frac{1}{2}}}. \tag{11}$$

Figure 5:
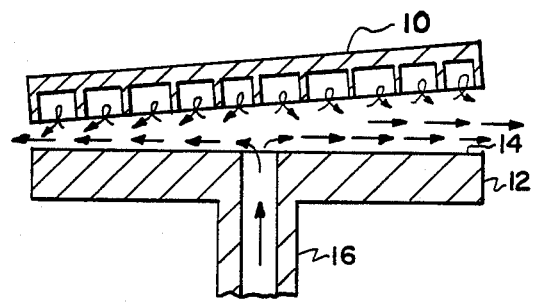
FIG. 5 is a sectional view of FIG. 2 along line 4—4 displaying a second embodiment of the present invention.
Figure 6:
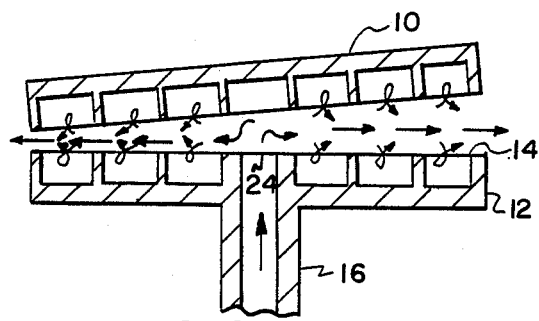
FIG. 6 is a sectional view of FIG. 2 along line 4—4 displaying a third embodiment of the present invention.

The honeycomb or labyrinth structure of ridges on supporting surface 14 shown in FIG. 3 could be placed on the bottom surface 46 of object 10 instead of on surface 14. This configuration is shown in Figure 5. Both surfaces 14 and 46 could include a honeycomb structure (see FIG. 6). Generally, however, it is preferrable to texture only the supporting surface. If the supported object is to be relatively motionless or is to spin, a textured object surface will subject the object to unwanted drag and torques.

Figure 7:
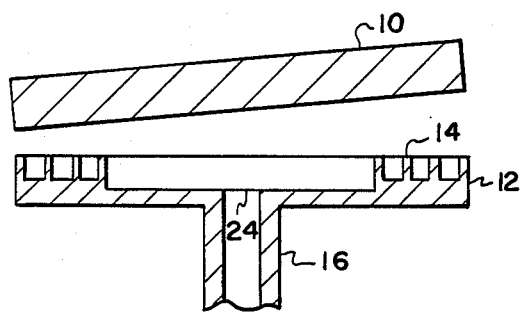
FIG. 7 is a sectional view of FIG. 2 along line 4—4 displaying a fourth embodiment of the present invention.
Figure 8A:
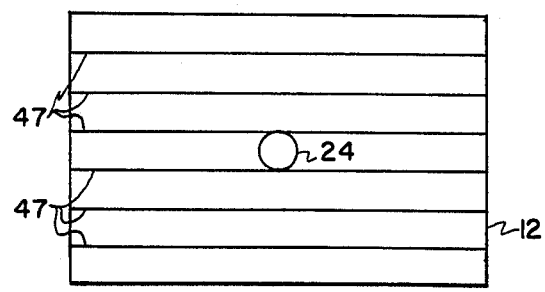
FIGS. 8a and 8b are plan views of opposing object and support surfaces displaying a fifth embodiment of the present invention.
Figure 8B:
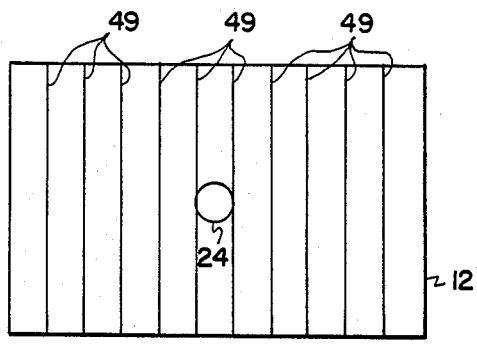

Only a portion of the object surface or supporting surface need include the expanded and reduced openings (see FIG. 7); or one of the surfaces can have ridges 47 running in a first direction (see FIG. 8a) and the other surface can have ridges 49 running in a second direction (see FIG. 8b) which is substantially nonparallel to the first direction. The honeycomb structure need not include cells with closed boundaries nor must the cells form close packed structured as shown. The cell boundaries may form regular plane polygons, such as the squares shown in FIG. 3.

The only limitation is that for any direction in which the supporting fluid may flow across either the supporting surface 14 or across the opposing object surface (i.e., surface 46), the outrushing fluid must encounter a series of constrictions which present sufficiently reduced cross sections to the flowing gas (relative to the cross section along the flow path at sites other than the constrictions) so that a substantial reduction in the dynamic head occurs at each abrupt expansion after the constrictions. Thus, by way of further generalization, each constriction need not be of the same dimensions.

The plurality of constrictions along the flow path can be further described as alternating reduced and expanded openings.

Figure 9:
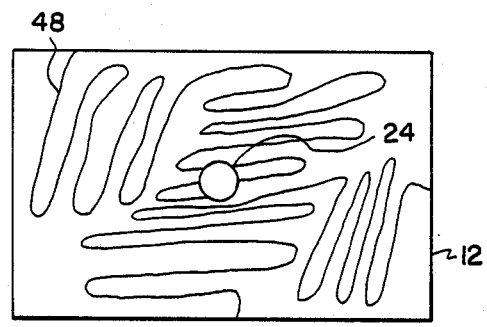
FIG. 9 is a top view of FIG. 1 with the supported object removed and also displaying a sixth embodiment of the present invention.

FIG. 9 indicates one of the vast number of patterns of ridges which can be employed in accordance with the present invention. Therein the labyrinth is provided by a meandering ridge line 48.

Figure 10:
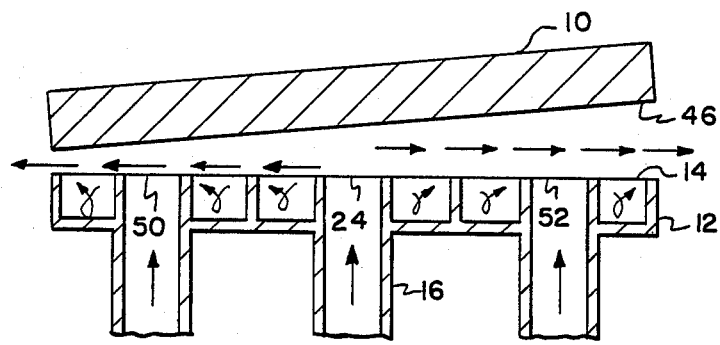
FIG. 10 is a sectional view of FIG. 2 along line 4—4 displaying a seventh embodiment of the present invention.

FIG. 10 further indicates that the particular means by which the supporting fluid is directed to surface 48 is not important. In the structure of Figure 10, three openings 24, 50 and 52 which intersect the plane of section line 4—4, are used to feed air along surface 14.

Figure 11:
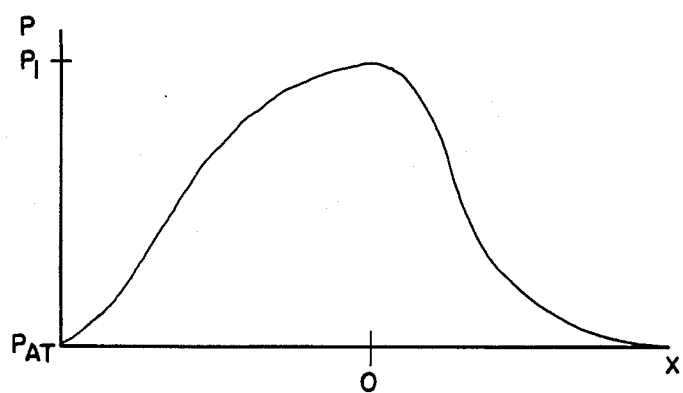
FIG. 11 is a qualitative graph of pressure versus distance along the support member of FIG. 4.

The textured wall of surface 14 offers a variation of pressure distribution with clearance variation which contributes to a stable restoring force when the supported object 10 is displaced from equilibrium. For example, consider the center fed textured hydrostatic structure of FIG. 3. Suppose that supported object 10 is tilted as shown so that the flow clearance decreases going from left to right. Considering the form of the expression for the pressure drop (i.e., equation 5 and in particular noting that $\Delta p^2$ is proportional to $1/A^2$), one can qualitatively sketch the pressure profile versus radius from opening 24 as shown in FIG. 11. FIG. 11 demonstrates that added support is produced on the down-tipped side of object 10 and diminished support is provided on the up-tipped side. Thus, there is some automatic spring stabilization inherent in the structure of the present invention. Stabilization will be further enhanced by the standard hydrostatic bearing feature of multiple feed points, each being feed from the central source through its own series flow restrictor.

Textured surface 14 could be prepared by starting with the smooth surface, and then laying down a protective network of wax. The surface could be etched which would generate recesses separated by a network of ridges.

What is claimed is:

1. A device for hydrostatically supporting an object with a fluid, comprising:
    a support member having a support surface;
    means for directing the flow of said fluid to and across the surface of said object, and to and across said support surface; and
    wherein at least a part of either said supporting surface or of said object surface is in contact with said fluid and includes a plurality of ridges, each of said ridges comprising a raised portion which extends beyond adjacent portions of said support surface or said object surface, and wherein said ridges are positioned so that said fluid will cross a plurality of said ridges in any direction that said fluid flows.

2. A device for hydrostatically supporting an object with a fluid, comprising:
    a support member having a support surface;
    means for directing the flow of said fluid to and across the surface of said object, and to and across said support surface; and
    wherein at least a part of either said supporting surface or of said object surface is in contact with said fluid and includes a plurality of cells, wherein said cells each have a closed boundary comprising a raised portion extending beyond adjacent portions of said support surface or of said object surface and wherein said cells are positioned so that said fluid will cross the boundaries of several of said cells in any direction that said fluid flows.

3. The device of claim 2 wherein said raised portions extend equidistance beyond said adjacent portions.

4. The device of claim 3 wherein said boundaries form a close packed pattern.

5. The device of claim 4 wherein each of said boundaries is a regular plane polygon.

6. The device of claim 4 wherein the distance between opposed sides of said cells exceeds the width of any raised portion forming said cell boundary.

7. A device for hydrostatically supporting an object with a fluid, comprising:
    a support member having a support surface;
    means for directing the flow of said fluid to and across the surface of said object, and to and across said support surface; and
    wherein at least a portion of said supporting surface and at least a portion of said object surface are in contact with said fluid and are configured to provide a plurality of alternating reduced and expanded openings along any flow path of said fluid.

* * * * *